May 19, 1936.  M. L. MacDONALD ET AL  2,040,863
BUILDING MATERIAL
Original Filed Jan. 27, 1932  2 Sheets-Sheet 2
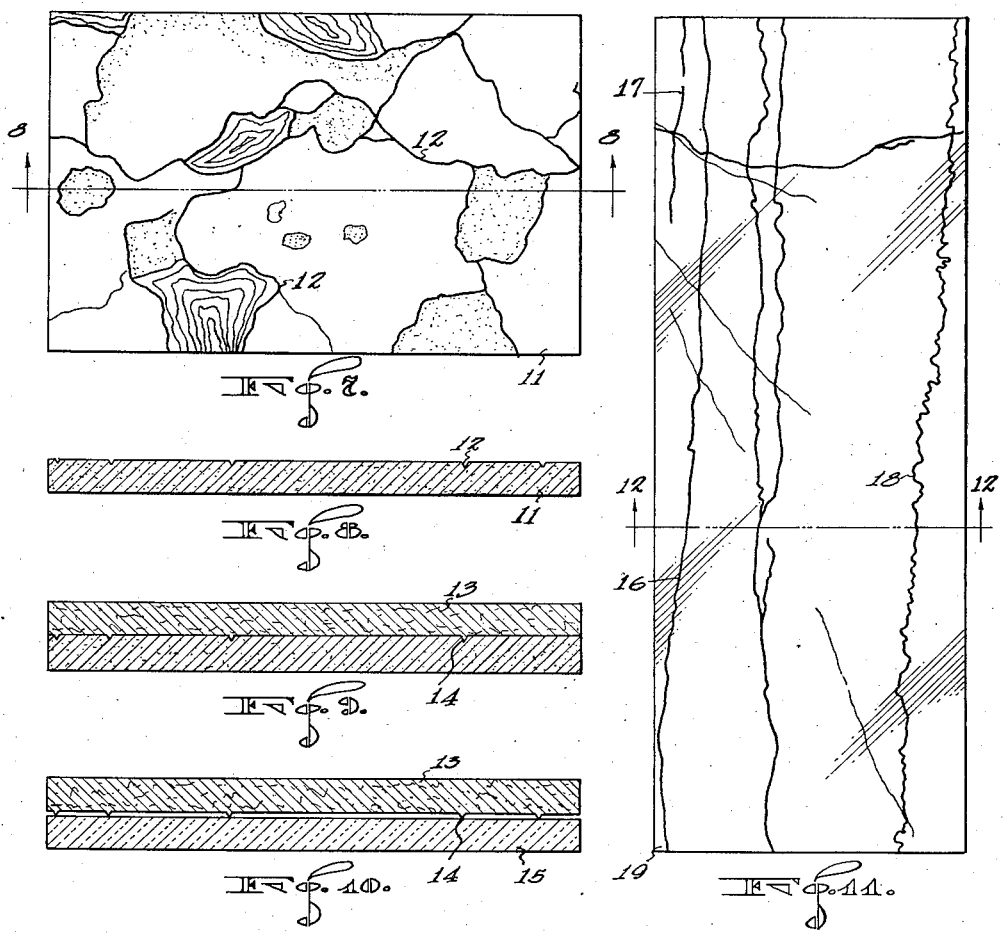
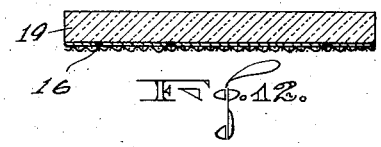
INVENTORS.
MAYHEW L. MACDONALD
ALEX VIDA.
BY
ATTORNEYS.

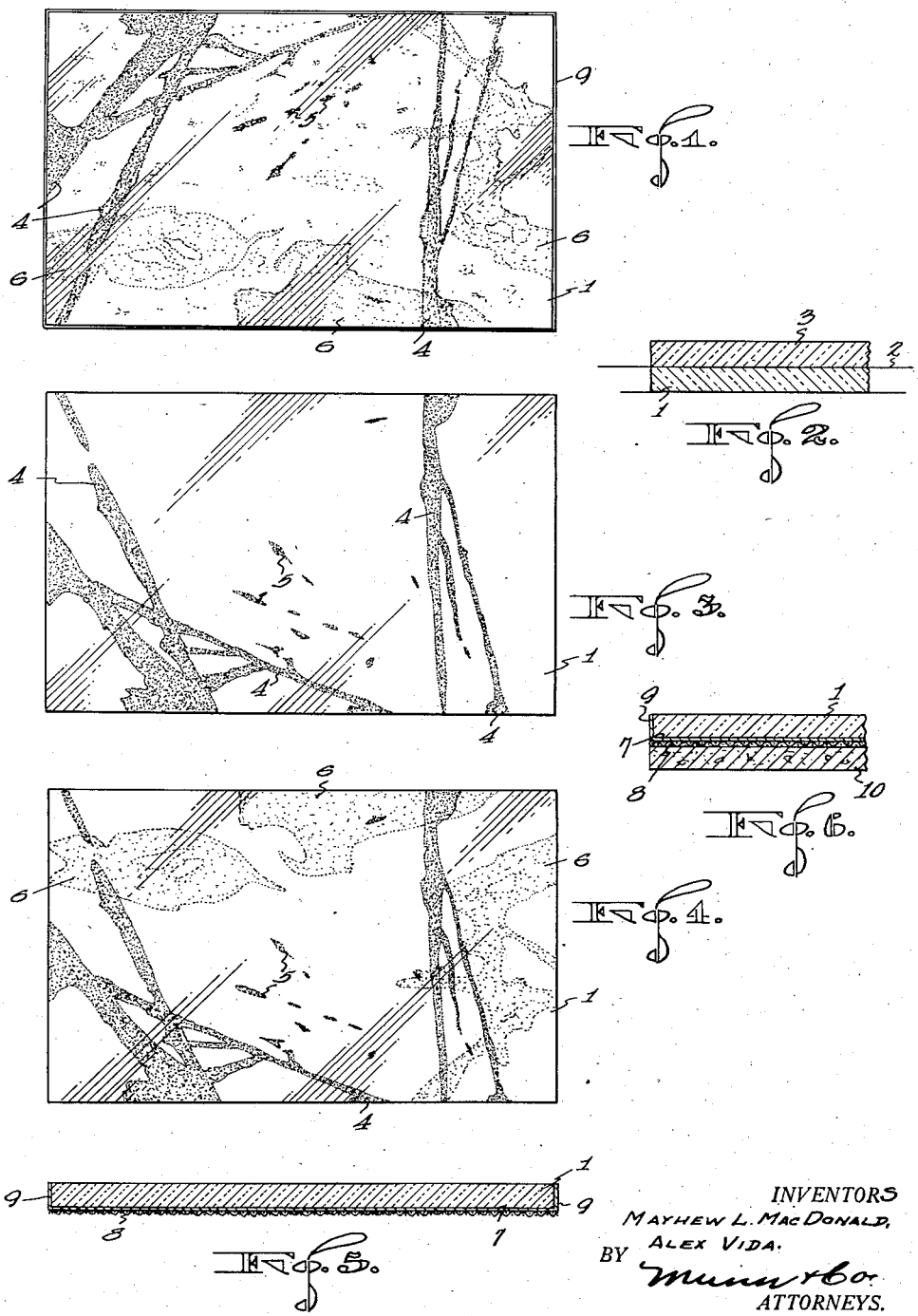

Patented May 19, 1936

2,040,863

UNITED STATES PATENT OFFICE 2,040,863

BUILDING MATERIAL

Mayhew L. MacDonald and Alex Vida, San Francisco, Calif., assignors of one-third to George S. MacGruer, San Francisco, Calif.

Application January 27, 1932, Serial No. 589,256
Renewed August 9, 1934

4 Claims. (Cl. 41—22)

The present invention relates to improvements in building material especially adapted for interior and exterior decorative work, and its principal object is to provide a building material in simulation of marble that may be manufactured economically and has great enduring and lasting qualities. More particularly it is proposed in the present invention to provide an artificial marble and a method of making the same in which glass or similar transparent material is used as a carrier and protective covering for material attached to the rear face thereof in such a manner as to present to a person looking through the glass the appearance and characteristics of any desired kind of natural marble.

It is further proposed in the present invention to provide a method of applying paint or similar material to the back of a glass plate or the like in such a manner that the paint material, when seen through the glass, presents the appearance of marble.

The art of manufacturing artificial marble is well understood at the present time, but all the artificial marble we are familiar with is made of plaster or similar cementitious material, and is prepared substantially in the following manner: The veins and all the other color characteristics of the genuine marble to be simulated are placed on a glass covered bench or on specially prepared tables or molds and are then put through a drying process which is usually done by first placing a large sheet of scrim cloth over the entire mixture and then covering the cloth with dry cement to act as a blotter. The dry cement is left to absorb most of the moisture from the mass of colored material constituting the veining and other color characteristics whereupon the cloth containing the dry materials is removed to allow of vigorous troweling in order to prepare the colored material for receiving the necessary backing of another cement mixture to properly back up or reinforce the same to the desired thickness. The entire mass is then allowed to set before it is removed from the tables, benches or molds, and then it is necessary to subject the wearing surface of the marble slab thus obtained to various honing, filling and polishing operations to remove imperfections which is very time consuming and expensive. It has also been found that the polished surface when exposed to the weather is subject to wear and requires cleaning and repolishing from time to time.

Our new method of producing artificial marble obviates all of this expensive filling, honing and polishing work which distinguishes it from all other methods of making artificial marble, the glass vehicle furnishing the polished surface.

Another advantage of our invention and our method of making artificial marble resides in the fact that our method entirely reverses the usual operations of the veining and color characteristics as we at all times have in full view the product for inspection and correction of the character of marble it is desired to simulate.

A further advantage of our invention is that the color characteristics and veining are at all times out of contact with the exposed wearing surface and all filling, honing and polishing is entirely eliminated, the glass vehicle providing the finished polished article.

Another advantage of our invention is that our process may be readily modified in various ways for producing different effects and more particularly our process allows certain marbles to be simulated which have never been simulated before in artificial marble, especially those which instead of the large veins found in most marbles have fine, irregularly curved hair lines and zigzag lines which it is practically impossible to reproduce in cementitious artificial marble.

Further objects and advantages of our invention will appear as the specification proceeds.

The preferred forms of our invention are illustrated in the accompanying drawings, in which Figure 1 shows a plan view of a piece of artificial marble made in accordance with one method of our invention;

Figure 2 a cross-section illustrating a certain step in said process;

Figure 3 a plan view of the reversed plate as it appears after the first step of said process;

Figure 4 a plan view of the reversed plate as it appears after a series of intermediate steps;

Figure 5 a section through the plate taken along line 4—4 of Figure 1;

Figure 6 a section through a modified form of plate having a coat of elastic cement added to the back thereof;

Figure 7 a block of cementitious material having a configuration of hair lines cut thereinto in simulation of the vein effect of a piece of marble of different character;

Figure 8, a section taken along line 8—8 of Figure 7;

Figure 9, a similar section showing a block of rubber superimposed and molded on the block of Figure 7 to form a negative thereof;

Figure 10, a similar section illustrating the use of one of these negatives on a glass plate;

Figure 11, a plan view of a slab of artificial marble of still different characteristics made in accordance with a modified form of our process; and Figure 12 a section taken along line 12—12 of Figure 11.

While we have shown only the preferred forms of the invention, we wish to have it understood that various changes or modifications may be made within the scope of the claims hereto attached without departing from the spirit of the invention.

In its preferred form our invention comprises a glass plate 1 to the rear face of which paint or similar material is applied in such a manner as to present the veins and color blends usually found in natural marble. The method of making this building material is substantially as follows:

We place the plate of glass 1 or equivalent transparent material upon a suitable horizontal support. Having before us preferably a piece of genuine marble in imitation of which our artificial marble is to be made, we procure paint mixtures and blends representing substantially all the colors found in the natural marble to be simulated. We then take a skein of raw silk 2 and spread the same into a plurality of strands in such a manner that the arrangement of the strands substantially corresponds to the characteristics of the veins on the marble. This means for reproducing veins is well known in the art of making artificial marble. However, we claim to be the first to employ a skein of silk or strands of hair-like material in the manner which will be fully set forth hereinafter. The silk thus arranged is dipped into paint and is then placed on the upper face of the glass 1 to deposit paint thereon in simulation of the veins on the marble to be imitated. A second plate 3, preferably of the same form as the first plate, is then placed on top of the latter, whereby all the silk threads are pressed not only against the upper face of the first plate, but also against the lower face of the second plate so that a veining effect is produced on the second plate which is complementary to that of the first plate, the relation between the two plates being the same as that existing between two complementary blocks of marble cut from one piece. In a similar manner further plates may be successively placed on the glass 1 to receive the same veining effect as the second plate.

It should be noted in this connection that while we preferably employ paint for producing the veining effect we do not wish to be confined to this particular material. In certain cases we may find it expedient to use a plaster mixture or the like, relying on paint applied during the successive steps for holding the plaster to the glass. When referring to paint it should be understood that this expression is intended to cover all suitable painter's materials such as oil paints, lacquers, enamels, dyes, water colors, synthetic paints, etc.

This operation is preferably repeated a second time, possibly with a slightly different shade of paint, according to the vein structure of the marble to be imitated. It should be observed here that it is not necessary to wait for the first series of veins to dry before the second series is applied. In some cases it may be desired to have the several series of veins run into each other to some extent while in other cases more sharply defined veins may be desired. These effects are all subject to the discretion of the operator who may, by the proper selection of his paint materials, produce almost any desired effect. It should be understood that after each operation the second glass plate is placed upon the first glass plate for receiving the same vein effect.

In many kinds of marbles there are long veins and shorter veins, and if it is desired to produce the effect of shorter veins a similar silk netting may be used in such a manner that only a portion thereof is lowered upon the face of the glass plate in different places. At the end of these operations the glass plate presents the appearance of Figure 3, the long veins being shown at 4 and the shorter ones at 5.

After all the veins have been applied the artist then mixes his paints so as to substantially correspond to the different shades of the body portion of the marble to be imitated, and applies the same to each of the glass plates. The first application is preferably made by means of a teaspoon or similar device, and splotches 6 of different shades of paint corresponding to the shades of the natural marble are deposited on each glass plate in such formation, arrangement and position as to approach the general artistic effect of the natural marble. Some of these splotches may be applied in separated spots of the plate while others may be applied in adjacent or overlapping relation for blending effects. After the outstanding shades of the natural marble have thus been applied the entire space of the plate is then filled with paint 7 of the main characteristic shade of the natural marble. This paint is preferably applied by means of a whisk-broom or the like, the paint being sprayed or sprinkled on the surface of the glass so as to cover the entire area thereof.

Now the plate is lifted carefully and preferably tilted back and forth a few times, or otherwise agitated or vibrated for the purpose of insuring a perfect covering of the whole plate with paint, and of filling any pin holes or voids appearing on the surface of the paint, and of effecting a natural blending of the different colors while the paint is still wet or in a semi-liquid state. This cannot be done in any other one of the well-known methods of manufacture or artificial marble in which the material must lie in a horizontal position and must remain undisturbed until sufficiently set to receive the backing material. Any surplus material is then allowed to drip off the plate, preferably into a special receptacle reserved for that purpose. The paint is now allowed to dry for a period of say twenty-four hours, whereupon a new coat of paint is applied on top of the first coat. For this purpose we preferably use the surplus paint that dripped off the plate the day before because this surplus paint constitutes a blend most perfectly harmonizing with the colors previously applied. While this paint is still wet we place thereon a piece of cloth 8 or similar material which constitutes a bond for all the paint applied to the glass surface and knits the paint into a unit which tends to cause a more perfect adhesion of the paint to the glass surface when the plate is set up as a piece of building material. The edges of the plate are also preferably painted with the same material, as shown at 9, to avoid reflection on the depth of the glass at the joints. If greater thickness of the marble slab thus produced is desired, a layer of elastic cement may be added on top of the last coat of paint, as shown at 10 on Figure 6.

It will be noted that this method of making an artificial marble is comparatively simple, is far superior to the conventional methods of making artificial marble in which cementitious material is molded on a glass plate to be separated therefrom upon completion, and in which a great amount of time has to be spent on the filling, honing and polishing of the surface. Our method does away with all of these operations altogether since the glass plate itself forms a polished surface. Our building material is also superior to artificial marble made in accordance with conventional methods and even to natural marble insofar as the wearing face of the marble is not exposed to the elements and the atmosphere in any way but is protected by the glass. All artificial marble, particularly if exposed to the weather, requires re-polishing from time to time, and will deteriorate while our artificial marble is essentially weather-proof since the veins and the surface structure producing the marble effect are not exposed to the weather.

The cloth attached to the rear face of the glass plate behind the paint not only serves to form a bond for the paint but also renders the glass plate practically shatter-proof since in case of a violent concussion such as would break the glass and any corresponding slab of marble or artificial marble, the cloth would tend to hold the shattered glass in place.

In mixing the various paints the artist or operator may use his own discretion, and he will find it preferable in some cases to use different kinds of paint materials for the veins and the body according to whether the natural marble to be imitated calls for clearly defined vein structure or for a blending of the veins with the body structure. Where clearly defined veins are desired it is best to use two different kinds of paint materials that do not readily mix, as for instance a synthetic paint for the veins and an oil paint for the body. In this respect many changes and variations may be made suiting the particular preferences of the artist making the material, and also the particular characteristic of the marble to be imitated without departing from the spirit of the invention. In some cases it may be found desirable to add to the paint crushed mica, bronze shavings and similar substances alone or in conjunction with sodium silicate, acetone, celluloid or any other translucent or even transparent material to produce certain effects found in natural marble.

It may be found desirable for the production of still other artistic effects found in natural marble, to adopt different measures within the scope of this invention. Some marbles, for instance, when cut and polished present a certain effect of a large number of very small holes or depressions known as pin holes, and if it is desired to simulate this effect the operator or artist may screen dry material over portions of the glass before the body coat of paint is applied.

There are also other kinds of natural marble in which the large and pronounced vein effect is not present, and in which the principal markings consist of small fissures of various colors or fine hair lines. To simulate these it may be advisable to use a stamp made of rubber or similar material, and molded in such a manner as to present a design closely simulating the character of the original marble which is to be imitated.

This method is illustrated in Figures 7 to 10. The marble to be imitated has the general vein effect shown in Figure 7. A photograph is taken of this marble and the lines are then traced on a block 11 shown in Figure 7, the traced lines appearing in the form of shallow grooves 12 presenting clear outlines of the veins found in this kind of marble. A block 13 of rubber, in the nature of a rubber stamp, is molded on this block of cementitious material so as to present ridges 14 corresponding to the grooves 12 of the cementitious block. This rubber block now is the negative to be used for the manufacture of our artificial marble and may of course be produced by any other well-known process.

This rubber block or stamp may then be impressed on a coat of paint pigment previously applied to the glass, or may be dipped into a layer of paint pigment spread on a smooth surface in the form of dust or in a paint paste or in liquid paint, and is then applied to the surface of glass plate 15 in the manner shown in Figure 10, leaving on the surface a clearly defined outline of the lines, veins or fissures shown in Figure 7, whereupon the process may be proceeded with by applications of splashes, a solid coating of paint and a second coating with the inlaid cloth material in the manner previously described.

Another form of artificial marble which it has been heretofore impossible to produce is illustrated in Figures 11 and 12. In this particular marble the veins have the character of sharply defined continuous or broken lines 16 and 17, or in sharply defined zig-zag lines 18. These lines are impossible to reproduce in artificial marble made according to the conventional methods. In our method the proceeding is exceedingly simple: A coat of paint is first applied to the glass plate 19 to present the general color characteristics of the marble to be simulated. After this coat has dried the desired lines are scratched into the paint by means of any suitable sharp or blunt instrument such as a knife, an ice pick, the edge of a putty knife, and the grooves thus made in the paint are filled with paint of the color characteristic of the veins desired to be simulated. For this purpose the paint may be applied by means of any suitable tool such as a brush and rubbed into the grooves by the use of the fingers or any suitable tool. After this paint has dried the backing may be applied in the manner previously described.

A further method of producing artificial marble in accordance with our invention, which is productive of very sharp and fine outlines, may be described as follows:

The bunch of silk strands previously referred to is first dipped into liquid glue, or any other suitable adhesive liquid whereupon superfluous glue is removed by sliding the bunch through the fingers or by any other suitable means so that the silk strands are still moist but not dripping. The silk strands are then spread in the manner previously described so as to form a net commonly referred to in the trade as the "veins" and are then placed on the glass plate. Thereupon the strands or veins are pressed upon the glass plate by means of a cloth or other suitable means so as to adhere to the glass. Next a coat of paint is applied which of course may be made to show the color characteristics of the marble to be simulated. The paint is then allowed to dry, with the silk net still in place. After the paint has dried the silk netting is pulled out of the paint so as to leave channels or grooves in the paint, whereupon a second coat of paint, preferably of a different color, is applied. This second coat of paint penetrates into the channels or grooves and fills the same so as to produce the vein effect. This method not only produces exceedingly clear outlines but also allows different color effects or shades to be produced in the veins themselves. The operator, for instance, may apply a darker shade at both ends of the plate, a lighter shade in the middle portion and may cause the different shades to blend in the intervening portions of the plate.

We claim:

1. A building material comprising a glass plate having its rear face opaqued to present a desired configuration appearing through the glass and having a protective coat of paint and cloth material embedded in the protective coat so as not to be visible from in front of the glass.

2. The method of producing artificial marble by means of a glass plate which comprises the steps of applying an adhesive to the strands of a silk net, pressing the net upon the face of the plate, applying a coat of paint and allowing the same to set, of then withdrawing the net through the coat of paint whereby channels are formed in the paint and applying a second coat of paint to the channels.

3. The herein described method of manufacturing imitation marble comprising disposing in patterns and attaching hair-like material to one side of a transparent panel; covering said side of the panel and the hair-like material with paint; allowing the paint to dry; separating the hair-like material from the panel to provide fractures in the paint in precise agreement with the aforementioned patterns; then inlaying the fractures with a material of a character which combines with the paint and with the panel to produce a composite in simulation of a thin slab of polished marble wherein the paint provides the groundwork and the inlays the veins running through said groundwork when viewed from the opposite side of the panel.

4. A building material comprising a glass plate having its rear face opaqued to provide an ornamental surface which is visible from the opposite side of the plate; a protective coat of paint covering said opaqued face; and a cloth material embedded in the protective coat so as not to be visible from said opposite side of the plate.

MAYHEW L. MacDONALD.
ALEX VIDA.